US006893675B1

(12) United States Patent
Jacobson et al.

(10) Patent No.: US 6,893,675 B1
(45) Date of Patent: May 17, 2005

(54) ACIDIFIED IMITATION CHEESE SAUCE AND PUDDING COMPOSITIONS AND METHODS FOR PRODUCING SUCH COMPOSITIONS

(75) Inventors: Michael R. Jacobson, Spring Valley, WI (US); Stephen M. Schalow, Leola, PA (US)

(73) Assignee: AFP Advanced Food Products LLC, New Holland, PA (US)

( * ) Notice: Subject to any disclaimer, the term of this patent is extended or adjusted under 35 U.S.C. 154(b) by 221 days.

(21) Appl. No.: 09/888,818

(22) Filed: Jun. 25, 2001

Related U.S. Application Data
(60) Provisional application No. 60/213,626, filed on Jun. 23, 2000.

(51) Int. Cl.[7] .......................... A23L 1/0522; A23L 1/187
(52) U.S. Cl. .......................... 426/589; 426/576; 426/578
(58) Field of Search .................................. 426/589, 576, 426/578

(56) References Cited

U.S. PATENT DOCUMENTS

| | | |
|---|---|---|
| 3,269,842 A | 8/1966 | Mayer et al. |
| 3,355,298 A | 11/1967 | Loter |
| 3,359,116 A | 12/1967 | Little |
| 3,391,002 A | 7/1968 | Little |
| 3,492,129 A | 1/1970 | Carswell et al. |
| 3,645,757 A | 2/1972 | Gordon et al. |
| 3,929,892 A | 12/1975 | Hynes |
| 3,955,010 A | 5/1976 | Chozianen |
| 3,969,534 A | 7/1976 | Pavey et al. |
| 4,031,254 A | 6/1977 | Kasik |
| 4,089,981 A | 5/1978 | Richardson |
| 4,143,175 A * | 3/1979 | Whelan et al. ............. 426/582 |
| 4,199,608 A | 4/1980 | Gilmore |
| 4,212,893 A | 7/1980 | Takahata |
| 4,235,934 A | 11/1980 | Egli et al. |
| 4,324,804 A | 4/1982 | Davis |
| 4,352,832 A | 10/1982 | Wood |
| 4,387,109 A | 6/1983 | Kahn |
| 4,390,560 A | 6/1983 | Koide |
| 4,434,184 A | 2/1984 | Kharrazi |
| 4,478,859 A | 10/1984 | Fox, Jr. |
| 4,499,116 A | 2/1985 | Zwiercan |
| 4,539,212 A | 9/1985 | Hunter |
| 4,568,555 A | 2/1986 | Spanier |
| 4,597,971 A | 7/1986 | Davis |
| 4,597,976 A | 7/1986 | Doster |
| 4,608,265 A | 8/1986 | Zwiercan |
| 4,623,552 A * | 11/1986 | Rapp ........................ 426/575 |
| 4,678,673 A | 7/1987 | Marshall |
| 4,684,533 A | 8/1987 | Kratochvil |
| 4,693,901 A | 9/1987 | Hullah |
| 4,724,152 A | 2/1988 | Baker |
| 4,734,291 A | 3/1988 | Raffensperger |
| 4,741,911 A | 5/1988 | McIntyre |
| 4,748,026 A | 5/1988 | Keefer et al. |
| 4,749,584 A | 6/1988 | Wirchansky et al. |
| 4,762,726 A | 8/1988 | Soucie et al. |
| 4,789,553 A | 12/1988 | McIntyre et al. |
| 4,859,484 A | 8/1989 | Bielskis et al. |
| 4,873,094 A | 10/1989 | Pischke et al. |
| 4,937,091 A | 6/1990 | Zallie et al. |
| 4,968,512 A | 11/1990 | Kharrazi |
| 4,970,083 A | 11/1990 | Akahoshi et al. |
| 5,009,867 A | 4/1991 | Kratochvil |
| 5,013,573 A | 5/1991 | Bodor et al. |
| 5,063,073 A | 11/1991 | Kratochvil |
| 5,079,024 A | 1/1992 | Crane |
| 5,094,873 A | 3/1992 | Kerrigan et al. |
| 5,098,728 A | 3/1992 | Singer et al. |
| 5,098,729 A | 3/1992 | Engel |
| 5,108,773 A | 4/1992 | Smith et al. |
| 5,171,603 A | 12/1992 | Singer et al. |
| 5,180,604 A | 1/1993 | Crane et al. |
| 5,196,215 A | 3/1993 | Yokoyama et al. |
| 5,209,942 A | 5/1993 | Bauer et al. |
| 5,286,510 A | 2/1994 | Bauer et al. |
| 5,308,632 A * | 5/1994 | Howard et al. ............. 426/460 |
| 5,320,860 A | 6/1994 | Duval et al. |
| 5,378,488 A | 1/1995 | Dimler et al. |
| 5,439,697 A | 8/1995 | Gonzalez-Sanz et al. |
| 5,472,718 A | 12/1995 | Ijsseldijk et al. |
| 5,670,197 A | 9/1997 | Adrianson et al. |
| 5,807,601 A * | 9/1998 | Carpenter et al. .......... 426/578 |
| 5,879,729 A | 3/1999 | King Solis et al. |
| 5,882,704 A | 3/1999 | Yamaguchi et al. |
| 5,882,713 A | 3/1999 | Eskins et al. |
| 5,895,685 A | 4/1999 | Bodor et al. |
| 5,935,634 A | 8/1999 | Gamay et al. |
| 5,948,452 A | 9/1999 | Monte |

(Continued)

FOREIGN PATENT DOCUMENTS

| | | |
|---|---|---|
| CA | 1071920 | 2/1980 |
| CA | 1131982 | 9/1982 |
| GB | 2061693 | 5/1981 |
| JP | 58071880 | 4/1983 |
| WO | 9203934 | 3/1992 |
| WO | 9208361 | 5/1992 |
| WO | WO 00/70970 | * 11/2000 |

OTHER PUBLICATIONS

Low–Acid Food Amendments Suggested for Processed Cheese Spreads, Food Chemical News, 1986.

(Continued)

Primary Examiner—N. Bhat
(74) Attorney, Agent, or Firm—Volpe and Koenig, P.C.

(57) ABSTRACT

An acidified imitation cheese sauce or pudding is prepared comprising a thickener, an acidulant in an amount not grater than about 0.5% equivalents of glacial acetic by weight of the composition, and a protein in an amount of less than 1% by weight of the composition. The acidified composition has a pH of not more than 4.6, moisture in an amount of at least about 55% by weight of the composition, a moisture phase acidity level of not more than about 1.5%, and organoleptic properties similar to a low acid cheese sauce or low acid pudding. Methods for the preparation of the acidified composition are also provided herein.

98 Claims, No Drawings

U.S. PATENT DOCUMENTS

| | | | |
|---|---|---|---|
| 6,013,303 | A | 1/2000 | Reddy et al. |
| 6,016,935 | A | 1/2000 | Huegerich et al. |
| 6,056,979 | A | 5/2000 | Benbadis et al. |
| 6,093,439 | A | 7/2000 | Whaley et al. |
| 6,113,976 | A | 9/2000 | Chiou et al. |
| 6,203,842 | B1 | 3/2001 | Reddy |
| 6,217,917 | B1 | 4/2001 | Bodor et al. |
| 6,228,419 | B1 * | 5/2001 | Yuan et al. .............. 426/661 |
| 6,322,841 | B1 | 11/2001 | Jackson et al. |
| 6,358,551 | B1 | 3/2002 | Sadowsky, IV et al. |

OTHER PUBLICATIONS

Tanaka et al., Evaluation of Factors Involved in Antibotutinal Properties of Pastuerized Process Cheese Spreads, Journal of Food Protection, vol. 49, No. 7, 1986.

Brummel et al., Soluble Hydrocolloids Enable Fat Reduction in Process Cheese Spreads, Journal of Food Science, vol. 55, No. 5, 1990.

L. Leistner, Futher Developments in the Utilization of Hurdle Technology for Food Preservation, Journal of Food Engineering 22, 1994.

Eckner et al., Contribution of Composition, Physiochemical Characteristics and Polyphosphates to the Microbial Safety of Pasteurized Cheese Spreads, Journal of Food Protection, vol. 57, No. 4, 1994.

Steeg et al., Growth of Proteolytic *Clostridium botulinum* in Process Cheese Products: I. Data Acquisition for Modeling the Influence of pH, Sodium Chloride, Emulsifying Salts, Fat Dry Basis, and Temperature, Journal of Food Protection, vol. 58, No. 10, 1995.

CAMPBELL'S® Tomato Bisque Soup (condensed).
CAMPBELL'S® Tomato Soup (condensed).
CAMPBELL'S® Mushroom Soup (condensed).
CAMPBELL'S® New England Clam Chowder (condensed).,
CAMPBELL'S® New England Clam Chowder (chunky-–style).
CAMPBELL'S® Cream of Potato (condensed).
VLASIC FOODS® OPEN PIT® Original Bar–B–Que Sauce.
KRAFT® Honey Bar–B–Que Sauce.
HUNT'S® SNACK PACK® Puddin' Pies™ (lemon meringue).
JELL–O® Fat–Free pudding Snacks (chocolate)
HUNT'S® SNACK PACK® Puddin' Pies™ (banana cream).
HUNT'S® SNACK PACK® Pudding (vanilla).
HUNT'S® SNACK PACK® Juicy Gels® (strawberry).
LUCKY LEAF® Apple Sauce.
KRAFT® HANDI–SNACKS® Pudding (tapioca).
KRAFT® HANDI–SNACKS® Pudding (butterscotch).
SWISS MISS® Lemon Meringue Pudding (Stirred).
JELL–O® Gelatin Snacks (strawberry & orange).
KRAFT® ROKA® Blue Cheese Salad Dressing.
KRAFT® FREE® Blue Cheese–Flavored Salad Dressing.
KRAFT® FREE® Ranch Salad Dressing.
HELLMANN'S® Real Mayonnaise.
WISH BONE® Thousand Island Salad Dressing.
KRAFT® Zesty Italian Salad Dressing.
HENRI'S® Fat–Free French–Style Dressing.
CAMBELL'S® Fiesta Nacho Cheese Soup.
CAMPBELL'S® Cheddar Chese Soup.
CAMPBELL'S® Tomato Soup.
CAMPBELL'S® Cream of Chicken.
FUNACHO® Aged Chedder Cheese Sauce.
FRITO LAY® Jalepeno Chedder Chese Dip.
HUNT'S® SNACK PACK® Juicy Gels® (strawberry orange).
JELL–O® Sugar Free Gelatin (raspberry and orange).
U.S. Patent Publication No. 2001–US–0018087, published May 12, 1999 (Coleman et al.).
U.S. Patent Publication No. US 2002/0071897 A1, published Jun. 13, 2002 (Hyde et al.).

* cited by examiner

ACIDIFIED IMITATION CHEESE SAUCE AND PUDDING COMPOSITIONS AND METHODS FOR PRODUCING SUCH COMPOSITIONS

CROSS-REFERENCE TO RELATED APPLICATION

This patent application claims the benefit of provisional U.S. Patent Application No. 60/213,626, filed on Jun. 23, 2000, the disclosure of which is incorporated herein by reference.

BACKGROUND OF THE INVENTION

The most commonly available forms of natural and imitation cheese sauces (collectively "cheese sauces") or pudding products presently produced for commercial sale in the United States market are "low acid" food products, as defined in 21 C.F.R § 114.3(d), which have a pH of greater than 4.6. Cheese sauces of the "low acid" category typically have a protein content of between 1% and 5% by weight, or more. Although use of protein components in cheese sauces greatly increases their production cost, it is generally considered in the industry that such high protein contents are necessary to produce a cheese sauce that has a body, mouthfeel, and flavor comparable to cheese sauces containing natal cheese. Thus, it is viewed that high protein content is a requisite to production of a cheese sauce acceptable to the consumer palate.

The conventional low acid cheese sauces presently available offer the consumer a good dairy-like taste, body, and mouthfeel, but because of their low pH, they can easily become spoiled by microbial growth and create an unpleasant and potentially dangerous culinary experience for the consumer if handled or packaged improperly. To reduce the potential for bacterial spoilage, government regulations pertaining to food safety require that low acid products, such as conventional low acid cheese sauces, must be subjected to severe heat sterilization procedures under conditions sufficient to kill C. botulinum and other pathogens.

Commonly used methods of preservation or means to control development of pathogens in a low acid product include aseptic, retort and hurdle processing methods, as well as control of pathogen growth by low water activity. Both aseptic processing and retort processing require heating the product to high temperatures (around 120° C.–148° C. or 250° F.–300° F.) to accomplish sterilization. The equipment used for these processes is expensive, and costly to operate and maintain. In addition, high temperature processing can result in what is referred to in the industry as "burn-on," linescale, or fouling of the product, where commercially unacceptable, burned, overcooked, or stale taste is imparted to the cheese sauce or pudding. Fouled product is unsaleable and is therefore discarded, resulting in waste of materials and labor. Accordingly, the productivity of the manufacturing process is decreased.

Even if heat sterilization does not result in degradation of non-hurdle low acid product, processed low acid food products, such as cheese sauces and puddings, must be retained by the manufacturer, by law, for an incubation period prior to release to the consumer, because of the potential for bacterial spoilage. The finished packaged product must be held in incubation for a minimum of approximately ten days before shipping in order to verify that the selected sterilization process was adequate and to evaluate the likelihood of subsequent on-shelf spoilage.

In the case of some conventional cheese sauces, bacterial stability is most often achieved though use of what is known in the art as "hurdle technology," a combined effect of carefully restricted levels of pH, moisture (water activity $a_w$), and salts (emulsifier phosphates and NaCl) in the processed cheese composition. Hurdle technology and its applications in the area of food preservation are well known and documented in the art, e.g., Tanaka, *J. Food Protect.*, vol. 49, no. 7, pp. 526–531 (July 1986), the contents of which are incorporated herein by reference.

In contrast to the conventional low acid cheese sauces and pudding products discussed above, "acidified" foods, as defined in 21 C.F.R. § 113.4(a), require neither a pre-shipment incubation period, application of costly sterilization techniques, nor are they restricted by the limitations of hurdle technology, because microbial growth is retarded in the acidic environment of a pH of not greater than 4.6 (i.e., 4.6 or less).

Because of the numerous safety, regulatory, and manufacturing advantages of high acid or "acidified" food products, significant efforts in the food industry have been directed toward attempts to develop an acidified composition suitable for use as a cheese sauce or pudding product that resembles, in taste, texture, and organoleptic properties, the conventional low acid cheese sauces or puddings presently on the market. Such an acidified food composition would have the benefit of being safer than conventional low acid cheese sauces or puddings, because the acidic pH is sufficient to retard the growth of microbial pathogens, even in the absence of heat sterilization. In addition, the processing costs would be less for an acidified cheese sauce or pudding, because it would not have to be heated to temperatures as high as its low acid counterparts, thereby reducing utility costs and increasing productivity by eliminating fouling or degradation of product quality. Moreover, an acidified composition would not require an incubation period and, because of the minimal processing required, would be compatible with more types of packaging and processing equipment than the conventional low acid cheese sauces or puddings.

However, prior attempts to produce an acidified cheese sauce or pudding product, i.e., one having a pH of not greater than 4.6, were accomplished by adding quantities of food grade acidulants to conventional low acid cheese sauce formulations. Because the conventional low acid formulations often contain significant quantities of proteins, such as milk proteins, whey proteins, and natural cheese solids (often as high as 5% by weight), and/or buffering emulsifiers, such as salts of citrates and phosphates, the amount of acid necessary to arrive at a pH of not greater than 4.6 resulted in products having a total titratable acid ("TTA") level of approximately 1.0% to 2.5%. The resulting cheese sauces were acidified, but because of the high acid content as measured by the TTA, they do not have the same savory and cheese-like tastes as the conventional low acid cheese sauces. Instead they are characterized by unpleasant sour, tart, and acidic notes and are therefore commercially unacceptable without the addition of flavor-imparting substances, such as tomatoes, onions, peppers, and smoke flavors, to mask the unacceptable tastes.

Consequently, there remains a need in the food industry for an acidified food composition useful in the manufacture of cheese sauces, puddings, or other cheese products, which possesses a flavor, texture, and consistency as good as or superior to conventional low acid cheese sauces or puddings, yet, by virtue of its acidic pH, is shelf stable and resistant to microbial growth.

BRIEF SUMMARY OF THE INVENTION

The invention is an acidified imitation cheese sauce or a pudding composition comprising a thickener, an acidulant, and a protein. The acidulant is present in the finished composition in an amount of not greater than 0.5% equivalents of glacial acetic acid by weight, and the protein is present in an amount of less than 1% by weight of the composition. Further, the composition has a pH of not more than 4.6, moisture in an amount of at least about 55% by weight of the composition, and a moisture phase acidity level (MPA) of not more than about 1.5%. The resultant composition has organoleptic properties similar to a low acid cheese sauce or pudding.

In one aspect, the thickener may be present in an amount of 0.1% by weight to about 30% by weight of the composition. The composition may contain a fat, and the fat may be present in an amount of up to 30% by weight of the composition. In compositions containing a fat, the fat phase may exist in emulsion or in suspension form in the finished composition.

In an aspect, the compositions can contain 0% by weight or minimal protein.

The compositions exhibit a Brookfield viscosity of about 5,000 centipoise to about 50,000 centipoise at 21° C., and further, the compositions possess a textural characteristic with a fracturability of about 0.29 N to about 2.9 N at 21° C.

The invention also provides a method of preserving an imitation cheese sauce or pudding where a composition having moisture in an amount of at least about 55% by weight of the composition, a thickener, a protein in an amount of less than 1% by weight of the composition, and a cheese flavoring is prepared and acidified to a pH of not more than 4.6 by addition of an acidulant in an amount of not greater than about 0.5% equivalents of glacial acetic acid by weight. The resulting imitation cheese sauce or pudding has an increased microbial stability and organoleptic properties similar to a low acid cheese sauce or pudding.

The invention also provides a method for increasing the microbial stability of an imitation cheese sauce or pudding composition wherein a composition containing moisture in an amount of at least about 55% by weight of the composition, a thickener, a protein in an amount of less than 1% by weight of the composition, and a cheese flavoring is prepared. Such composition is acidified to a pH of not more than 4.6 by addition of an acidulant in an amount of not greater than 0.5% equivalents of glacial acetic acid by weight. The resulting imitation cheese sauce or pudding has an increased microbial stability, and a textural characteristic such that its fracturability is about 0.29 N to about 2.9 N at 21° C.

DETAILED DESCRIPTION OF THE INVENTION

It has been discovered that acidified imitation cheese sauces or puddings having a pH of not greater than 4.6 can be made by combining at least a thickener, an acidulant in an amount not greater than about 0.5% equivalents of glacial acetic acid by weight, and a protein in an amount of less than 1% by weight. The resulting compositions are microbially stable, favorably resemble their conventional low acid counterpart products in organoleptic properties, such as taste, texture, and mouthfeel, and are less costly to produce.

The term "microbial stability," as used herein, means that the product so described does not support vegetative cell growth or spore germination to unacceptable levels.

The term "shelf stable," as used herein, means that the product so described can be distributed and merchandised at 21° C. (room temperature) with substantially little adverse affect on the microbial stability of the product.

Similar to conventional low acid cheese sauces, the imitation cheese sauce composition of the invention is smooth, creamy, and homogenous in texture. Upon consumption, the eater experiences a dense, but semi-fluid, body and a savory, cheese-like flavor characterized by the absence of any sharp or acidic notes.

The organoleptic properties of the pudding composition resemble those of conventional, low acid puddings in that the texture is smooth and creamy, and the composition is slightly starchy, with a slippery consistency and a lingering slickness on the palate and tongue upon consumption. The flavor of the pudding compositions is sweet, with underlying dairy notes, and is generally characterized by "traditional" dessert flavors, such as chocolate, vanilla, caramel, or fruit. The pudding, like the imitation cheese sauce, is most notably distinguished from other acidified pudding products of the prior art by the absence of sharp, tart, or acidic flavors, which are interpreted by the human palate to be inappropriate to dairy-type products, especially non-citrus-based dessert products.

The pH of the finished food composition, whether it is pudding or imitation cheese sauce, is not more than 4.6, with a more preferred pH of about 2 to about 4.5, and a most preferred pH of about 3.2 to about 4.4. The pH is measured upon completion of the finished composition, prior to final packaging.

Moisture is present in the imitation cheese sauce composition or pudding compositions in an amount of at least about 55% by weight of the composition. It is preferred that moisture be present in an amount of about 60% to about 95% by weight, more preferred that moisture be present in an amount of about 70% to 85% by weight, and it is most preferred that moisture be present in an amount of about 75% by weight of the composition. The moisture may be present as added moisture to the composition, or as a component of another ingredient (e.g., diluted acidulant).

The moisture phase acidity of a given product is related to its total titratable acid level and percent moisture content, and is considered in the food industry as one indicator of microbial stability. The moisture phase acidity level of the finished compositions of the present invention is not more than about 1.5%. It is preferred that the moisture phase acidity of the present compositions be about 0.11% to about 1.2%, more preferred that the moisture phase acidity be about 0.3% to about 0.9%, and most preferred that the moisture phase acidity be about 0.5% to about 0.7%.

Thickeners for use in the imitation cheese sauce or pudding compositions include, for example, any food grade starch, hydrocolloids, or mixtures of such known in the art. Examples of food starches useful in the manufacture of the imitation cheese sauces and/or puddings of the present invention include, but are not limited to, modified and unmodified food starches, cornstarch, rice starch, tapioca, wheat starch, flour, potato starch, dent cornstarch, waxy cornstarches, native food starches having cross linked polysaccharide backbones, and mixtures thereof. Preferred food starches for use in the compositions described herein are modified food starches, tapioca, potato starch, cornstarch, rice starch, and mixtures thereof. Also preferred for use in the compositions of the present invention are native food starches having cross-linked polysaccharide backbones.

Hydrocolloids which may be used as thickeners in the compositions of the invention include, for example, gelatin and food grade gums, such as guar gum, pectin, locust bean gum, xanthan gum, and ghatti gum. Other useful hydrocolloids include carboxymethylcellulose, agar, alginate, carrageenan kappa, iota, and lambda), and tragacanth. Preferred hydrocolloids include xanthan gum, guar gum, locust bean gum, carboxymethylcellulose (CMC), and carrageenan (kappa, iota, and lambda).

Further, mixtures of guns and hydrocolloids may be used as thickeners. Particularly preferred are mixtures of food starch and xanthan gum, and food starch and carboxymethylcellulose (CMC). In the case of a pudding composition, food starch and xanthan gum may be present in the thickener in a ratio of about 100:0.01 parts by weight to about 95:5 parts by weight, or food starch to carboxymethylcellulose in a ratio of about 80:20 parts by weight to about 95:5 parts by weight. In the case of an imitation cheese sauce, food starch and xanthan gum may be present in the thickener in a ratio of about 2:1 parts by weight to about 20:1 parts by weight.

When determining the precise amount of thickener to be used in a given composition, a person of ordinary skill in the art will recognize that the amount of thickener(s) may be varied in order to control the texture and viscosity of the desired composition. However, it is generally considered that the selected thickener or thickeners will be present in the composition in the amount of about 0.1% to about 30% by weight of the composition. It is preferred that the amount of selected thickener or thickeners be present in the amount of about 0.5% to about 10% by weight, more preferred in the amount of about 0.7% by weight to about 7% by weight, and it is most preferred that the amount of selected thickener or thickeners be present in the amount of about 4% to about 6% by weight of the composition.

In general, it is desirable that the thickener be added in an amount such that the imitation cheese sauce remains slightly pourable, but not excessively fluid at 21° C., and is capable of clinging to the food products to which it is applied, such as nacho chips or pasta. In the case of the pudding composition, frequently a thicker, more stiff texture may be desired, although a person of ordinary skill will recognize the amount of thickener may be varied and modified to meet the expectations of American consumers, who prefer a stiffer, almost meringue-like consistency, as well as those of the European consumers, who prefer a more runny, custard-type consistency in pudding.

The acidified imitation cheese sauce and/or pudding compositions described herein contain an acidulant present in an amount sufficient to reduce the pH to not more than 4.6, and thereby achieve microbial stability of the finished product. Acidulants for use in the present invention may include any food grade organic or inorganic acids or mixtures thereof. Examples of such acidulants are malic acid, citric acid, oxalic acid, tartaric acid, succinic acid, isocitric acid, fumaric acid, lactic acid, glucono-δ-lactone, propionic acid, acetic acid (vinegar), and mixtures thereof. Particularly preferred acidulants for either an imitation cheese sauce or a pudding include cultured dextrose, glucono-δ-lactone, phosphoric acid, lactic acid, and mixtures thereof. If the acidified composition prepared is to be a pudding, lactic acid is preferred, as it imparts a dairy note to the composition. Citric acid, on the other hand, may be avoided when preparing most pudding compositions, as its tart and sharp taste is often considered undesirable and inappropriate for a non-citrus flavored dessert.

The volume of the acidulant used in the composition will vary depending on the acidulant selected and the presence or absence of any buffering components in the composition. The volume should be sufficient to adjust the pH of the composition to not more than 4.6, but not to exceed a TTA of 0.5% by weight. Preferred volumes of acidulant for use in the composition are about 0.01% by weight to about 40% by weight of the composition, with a more preferred volume of about 10% by weight to about 35% by weight of the composition.

In any case, the total titratable acid (TTA) of the finished composition should not exceed about 0.5% by weight of the composition. As is understood in the art, the TTA of a given composition is determined by the percent by weight of equivalents of glacial acetic acid present in the finished composition, regardless of the volumetric amount of acidulant, type of acidulant, and or dilution of acidulant used. Therefore, the present compositions should have not greater than about 0.5% equivalents of glacial acetic acid by weight in the finished composition. It is preferred that the compositions contain about 0.01% to about 0.4% of equivalents of glacial acetic acid by weight, and it is most preferred that the composition contain about 0.1% by weight to about 0.3% by weight of equivalents of glacial acetic acid by weight.

The imitation cheese sauce compositions and the pudding compositions of the invention contain a protein in an amount of less than 1% by weight of the composition. It is preferred that the protein be present in an amount of up to about 0.7% by weight, and more preferred that the protein be present in the amount of about 0.2% by weight to about 0.5% by weight of the composition. It is most preferred that there be minimal protein or at least no added protein present (other than any incidental protein included in any flavorings or other ingredients).

If added protein is present in the composition, it is preferred that such protein have a low buffering capacity, so as not to require additional volume of acidulant to maintain the pH at not more than 4.6. Specifically, it is preferred that the protein or proteins selected for inclusion in the composition have a buffering capacity such that, in an 1% by weight solution of the protein or proteins in deionized water, no more than about 0.3 moles of acetic acid is required to change the pH of the solution one pH unit.

Additionally, depending on the texture or flavor desired, considerations of solubility (as indicated by the specific isoelectric points (pI) of a given protein or proteins) may guide the selection of the protein or proteins. It is preferred that the protein selected for use in the imitation cheese sauce or pudding compositions have an isoelectric point (pI) of at least about 5. Such protein(s) include alkali or acid processed gelatin and whey proteins.

When solubility and/or buffering capacity is not a concern, preferred proteins include soy protein, casein, egg proteins, hydrolyzed vegetable proteins, gelatin (alkali and acid processed), whey proteins, or mixtures thereof. In one embodiment, it is preferred that casein be avoided, as it may impart an objectionable texture to the composition upon processing.

Additionally, while other proteins may be present in the composition, it is preferred, in one embodiment, that no more than 1% of proteins having a pI of at least about 5 be included in the composition. In another embodiment, it is preferred that no more than 1% of a protein selected from whey protein, soy protein, casein, egg protein, or hydrolyzed vegetable protein be included in the composition.

Fats or oils for use in the present invention may be of animal origin, vegetable origin, or mixtures thereof. Such fats may be in liquid form or solid form at room temperature. Fats for use in the present compositions include, but are not limited to, lard, butter, cream, butter oil, fully saturated vegetable oils, partially hydrogenated vegetable oils, non-hydrogenated vegetable oils, soybean oil, sunflower oil, olive oil, canola (rapeseed) oil, cottonseed oil, coconut oil, palm kernel oil, corn oil, butterfat, safflower oil, or mixtures thereof. Preferred fats for use in either the imitation cheese sauce or pudding compositions include partially hydrogenated vegetable oils, soybean oil, canola oil, sunflower oil, safflower oil, palm kernel oil, coconut oil, butterfat, or mixtures of such fats. In some cases it is preferred that butterfat is used when preparing an imitation cheese sauce composition, as it lends a cheese-like note to the flavor of the sauce.

In general, the fat should be present in an amount sufficient to enhance the desired texture and consistency of the pudding or imitation cheese sauce composition. The fat or fats may be present in either the imitation cheese sauce or the pudding composition in an amount of about 10% to about 30% by weight. In the imitation cheese sauce composition, it is preferred that the fat(s) be present in an amount of about 5% to about 15% by weight of the composition. In most instances, the acidified pudding composition will contain a lesser amount of fat. In the acidified pudding compositions, it is preferred that the fat be present in an amount of up to about 5% by weight of the composition, preferably in an amount of about 2% by weight to about 4% by weight of the composition. Fat(s) may also be avoided, in order to manufacture a fat free composition for health- or calorie-conscious consumers.

If the imitation cheese sauce composition and/or pudding composition is prepared to contain a fat, the fat phase of the composition may exist in the finished product in emulsified form, e.g., in a dispersion facilitated by long chain alcohol emulsifiers, fatty acid emulsifiers, proteinaceous emulsifiers, or carbohydrate polymer emulsifiers, or in a suspension, i.e., dispersed and immobilized within the matrix of the thickener in the absence of emulsifiers.

If it is desired that the fat phase of the imitation cheese sauce composition and/or pudding composition be an emulsion, chemical emulsifiers may be included within the composition to facilitate emulsification. Chemical emulsifiers include, for example, glycerol esters, such as mono- and diglycerides and diacetyl tartaric acid esters of mono- and diglycerides (DATEM); acid pyrophosphate; sodium stearoyl lactylate; fatty acid esters, such as polysorbates; and phospholipids, such as lecithins. It is preferred that such chemical emulsifiers are present in the composition in an amount of up to about 5% by weight of the composition.

Depending on the desired end product, a sweetener or sweeteners may be added to the acidified imitation cheese sauce or pudding compositions in order to achieve a desired taste. It is particularly desirable that a sweetener be present in an acidified pudding composition. Sweeteners suitable for use in either the pudding or the imitation cheese sauce compositions include both artificial and natural sweeteners such as sucrose, saccharin, fructose, glucose, corn syrup, maltose, honey, glycerin, fructose, aspartame, sucralose, high fructose corn syrup, crystallized fructose, acesulfame potassium, and mixtures thereof. Particularly preferred sweeteners for use in at least the pudding composition are sucrose, corn syrup, high fructose corn syrup, and aspartame. The amount of sweetener used in each of the acidified compositions will vary, depending on the desired taste and the perceived sweetness of the specific sweetener selected, and can routinely be determined by a person of ordinary skill in the art.

Both the imitation cheese sauce composition and the pudding composition, as described herein, contain flavorings that impart to each product its characteristic taste. Imitation cheese sauce compositions of the present invention contain a cheese flavoring or combination of such flavorings. Suitable cheese flavorings include any which are known in the art, such as enzyme modified cheeses, enzyme modified lactile products, synthetic cheese flavorings, and lipolyzed dairy flavors. Suitable enzyme modified cheese flavorings and lipolyzed dairy flavors are available from, for example, International Flavors and Fragrances, Menomonee Falls, Wis., USA. Natural and synthetic flavors suitable for use in the imitation cheese sauces of the present invention are available from, for example, Edlong, Elk Grove Village, Ill., USA. The type of flavoring selected will vary depending on the specific natural cheese which the imitation cheese sauce composition is intended to mimic. For example, suitable natural cheese flavors for the cheese sauce composition include any natural cheese flavorings, such as cheddar, American, feta, Swiss, blue, Gorgonzola, asiago, romano, mozzarella, Parmesan, Colby, jack, Brie, Camembert, chevre, provolone, Gruyere, mimolette, and Gouda.

The pudding compositions described herein contain a flavoring that imparts a non-savory, dessert flavor to the composition. Such flavorings include, but are not limited to, flavorings of chocolate, vanilla, fudge, butterscotch, banana, caramel, raspberry, blackberry, hazelnut, coffee, almond, fruit, and nut. In general citrus or citrus-based flavors may be avoided, as such flavors frequently are accompanied by an increase in the acidic content of the composition in order to achieve an overall taste acceptable to the consumer. Preferred flavorings for use in the pudding composition are chocolate, vanilla, fudge, butterscotch, and banana.

The flavorings, whether they are the cheese flavorings or the non-savory, dessert flavorings, may be added to the composition in liquid or powder form. A person of ordinary skill in the art will recognize that the amount of flavoring will vary depending on the type of flavoring selected and the intensity of flavor desired within the composition.

As is known in the art, the texture and consistency of a composition is a manifestation of the composition's rheological properties, including viscosity and yield stress. Such properties must be carefully considered when preparing commercially acceptable food product that is intended to mimic a cheese sauce or pudding. In general, the viscosity of the imitation cheese sauce described herein is such that the composition is spoonable, slightly flowable, but still sufficiently thick and viscous to cling to foods to which the sauce is applied. Similarly, the viscosity of the pudding composition is such that it is slightly flowable, spoonable, yet capable of clinging to the interior of serving vessels and utensils. The viscosity of the composition, whether pudding or imitation cheese sauce, as measured by a Brookfield viscometer (No. 6 spindle, 20 rpm, 21° C.) is about 5,000 centipoise to about 50,000 centipoise. It is preferred that the viscosity of the compositions described herein be about 10,000 centipoise to about 30,000 centipoise as measured on a Brookfield viscometer, and it is more preferred that the viscosity be about 15,000 centipoise to about 20,000 centipoise as measured on a Brookfield viscometer.

The imitation cheese sauce composition and/or pudding compositions of the present invention have a texture profile comparable to their low acid counterparts. More precisely, the compositions of the invention have a textural character such that the fracturability of the compositions at 21° C. is from about 0.29 N to about 2.9 N as determined by texture profile analysis conducted on a Texture Technologies® TA-XT2I analyzer, available from StableMicro Systems, Scarsdale, N.Y., USA. It is preferred that the compositions have a fracturability of about 0.49 N to about 2 N, and most preferred that the compositions have a fracturability of about 0.59 N. The texture profile analysis to obtain the fracturability data of the compositions of the invention can be carried out routinely, as is known in the art and as described in, e.g., Bourne, M. C. 1982. *Food Texture and Viscosity*, Academic Press, New York (reprinted 1994), the contents of which are incorporated herein by reference.

If desired, bulking agents may be added to the compositions to enhance the textural properties. Suitable bulking agents include, but are not limited to, maltodextrin, corn syrup solids, dextrose, lactose, whey solids, or mixtures thereof.

Any colorants known in the art, including all Certified colorants and natural colorants may be used in the acidified food compositions to impart a pudding or cheese color to the compositions. If the end product desired is to be a yellow/orange imitation cheese sauce, the preferred colorants are Certified Yellow #5, Certified Yellow #6, annatto, carotenels, or oleoresin paprika. Additionally, particularly in pudding compositions, it may be desirable to include titanium dioxide to increase opacity.

If desired, preservatives may be included in the acidified food composition to prevent discoloration or decay, and to further ensure avoidance of microbial spoilage, or other degradation of the composition's components. Such preservatives include, for example, sodium benzoate, potassium sorbate, and EDTA.

In addition to the non-savory, dessert flavorings and the cheese flavorings discussed above, additional flavorings or flavor-enhancing additives may be included in the imitation cheese sauce or pudding composition, so long as such additions do not substantially alter the character of the composition. For example, in an imitation cheese sauce composition, such flavorings may include spices, such as black pepper, salt, paprika, garlic powder, onion powder, Worcestershire sauce, soy sauce, mustard flower, and yeast extract. Additionally, particulate components such as fruit or vegetable matter, meat, tofu, or nuts may be added to the imitation cheese sauce or pudding composition. In the case of an acidified pudding composition, suitable additional flavorings may include, for example, liquor flavors such as rum, brandy, fruit liquor, creme de menthe, cinnamon, nuts, fruits, chocolate chips or chocolate bits, rice or tapioca particles, hard candies, and jelly candies.

Although preferred amounts of the various components of the acidified food compositions have been detailed herein, it will be apparent to one of skill in the art that the amounts of the components can be varied depending on the taste, texture, viscosity, color, and/or other organoleptic properties desired in the final composition.

The acidified imitation cheese sauce compositions and pudding compositions described herein may be manufactured by a variety of acceptable methods commonly known in the art which achieve dispersion, suspension, and/or hydration and homogenization of the selected product components prior to the undertaking of any processing and packaging operations. Examples of equipment currently used in the art for such purposes include high-shear mixers, two stage high pressure dairy homogenizers, plate-type heat exchangers, ribbon blenders, scrape surface heat exchangers (SSHE), and lay-down cookers. Because of the microbial stability of the acidified food composition, the formulation is amenable to almost all manufacturing and packaging processes known in the art, unlike low acid products, which can only be rendered shelf stable with at least those manufacturing/production processes which involve high heat sterilization, hurdle processing, ohmic, or high pressure processing.

In general, according to a preferred procedure, the compositions of the present invention are manufactured by mixing, in hot water (about 68° C. or 155° F.), all of the selected fats, colorants, acidulants, emulsifiers, and flavorings under high shear in a high shear mixer. This portion ("the homogenized base") is then homogenized, preferably in two stages, at 2500/500 psi in a high-pressure dairy homogenizer. It is then cooled through a plate heat exchanger to about 10° C. (50° F.) and removed to a storage vessel. The selected thickeners and any desired particulate ingredients, such as vegetable matter, fruit or meats, are then suspended in cold water (about 10° C. or 50° F.) in the high shear mixer. The cold water suspension is then pumped into the cooled homogenized base. It should be apparent to those of ordinary skill in the art that the above-described mixing process is not limited to a two-stage process. The final mixture could be created in a single stage mix, with or without homogenization, as is sometimes practiced in the food industry.

The mixture formed by the addition of the cold water suspension to the homogenized base is then evaluated to ensure that it has the desired pH and TTA, before being further processed in such a way as to create a shelf stable product that requires no refrigeration.

If necessary or desired, the finished composition could be subjected to thermal or other processes to eliminate the potential for fungal spoilage. Such processes include pasteurization, irradiation, high-pressure or high-temperature sterilization, and ohmic heating, for example.

Packaging processes could include, for example, irradiation of the product; a high acid septic process technique, where the cooling of the product occurs in a process cooler, and the product is subsequently introduced into sterilized packages and sealed in a sterile zone; a hot fill process, where the product is heated to such a temperature as to kill yeasts, mold spores, and vegetative bacterial cells, the package is filled with a hot product, and the heat of the product kills unwanted pathogens in both the product and non-pre-sterilized packages; or a retort process, wherein the product is filled and sealed into packages at a relatively low temperature, after which it is heated in a pressurized retort vessel to a temperature sufficient to kill pathogenic microorganisms, and subsequently cooled. Any of these processes, when used in the manufacture of a composition of the present invention, will result in a commercially-sterile end product suitable for consumer consumption and which will remain shelf stable at room temperature.

The invention is further illustrated by the following specific, non-limiting examples.

EXAMPLE 1

A typical acidified imitation cheddar cheese sauce composition was prepared in accordance with the present invention as follows. A homogenized base was mixed in a high shear mixer at about 75° C. The homogenized base consisted of the following ingredients:

| No. | Ingredient | Percent (by weight) |
|---|---|---|
| 1 | Water | 40.0 |
| 2 | Partially hydrogenated soybean oil | 9.0 |
| 3 | Gulcono-δ-lactone | 0.35 |
| 4 | DATEM | 0.1 |
| 5 | Acid polyphosphate | 0.1 |
| 6 | Southwestern spices | 0.1 |
| 7 | Enzyme modified cheddar cheese flavoring | 3.5 |
| 8 | Yeast extract | 0.8 |
| 9 | Lipolyzed cream flavor | 0.11 |
| 10 | Certified Yellow colorings | 0.0095 |
| 11 | Maltodextrin | 2.22 |
| 12 | Salt | 1.7 |
| 13 | Oleoresin capsicum | 0.01 |

After thorough mixing, the homogenized based was then homogenized using a two-stage homogenizer at 2000/500 psi, and removed to a storage vessel. In the storage vessel, the homogenized base was cooled to 21° C.

A slurry base was then prepared in the high shear mixer. The slurry base consisted of the following ingredients:

| No. | Ingredient | Percent (by weight) |
|---|---|---|
| 14 | Water | 34.55 |
| 15 | Modified dent cornstarch (MIRA CLEER ® 340) | 2.6 |
| 16 | Modified waxy cornstarch (REZISTA ®) | 2.5 |
| 17 | Xanthan gum | 0.1 |
| 18 | Dry sugar (sucrose) | 1.0 |
| 19 | Vegetable puree (hot peppers) | 1.25 |

Ingredient nos. 15 and 16 were obtained from A. E. Staley, Decateur, Illinois, USA.

The slurry base was mixed at 50° C. (120° F.), in order to prevent excessive blooming of the starch components.

The slurry base was then combined with a homogenized base in the high shear mixer, until each base was thoroughly mixed with the other. The resulting acidified imitation cheese sauce had a finished pH of 4.2, total solids of 22% by weight, 0.025% protein by weight, a density of 9 pounds per gallon, a moisture content of 78% by weight, a TTA of 0.4% by weight, a moisture phase acidity level of 0.65%, and a viscosity of approximately 20,000 centipoise at 21° C.

The acidified imitation cheese sauce was then packaged in plastic cups. It was first pumped through a scrape surface heat exchanger (SSHE) system and heated to about 100° C. (212° F.). It was then deposited into preformed, pre-sterilized plastic cups. Plastic coated metallic lids were heat-sealed onto each plastic cup. The filled and sealed cups were inverted and held for approximately two minutes, then cooled via hydrocooler to approximately 49° C.

EXAMPLE 2

An acidified alfredo-type imitation cheese sauce suitable for use in pasta dishes was produced by the process of Example 1, with the exception that the type and quantity of ingredients used were those listed in the table below.

| No. | Ingredient | Percent (by weight) |
|---|---|---|
| 1 | Water (homogenized base portion) | 38.20 |
| 2 | Partially hydrogenated soybean oil | 9.00 |
| 3 | Modified dent cornstarch (MIRA CLEER ® 340) | 5.25 |
| 4 | Modified waxy cornstarch (REZISTA ®) | 2.00 |
| 5 | Salt | 1.70 |
| 6 | Enzyme-modified parmesan and romano cheese (1:1 blend) | 3.10 |
| 7 | Yeast extract | 0.80 |
| 8 | Glucono-δ-lactone | 0.30 |
| 9 | Acid pyrophosphate | 0.10 |
| 10 | DATEM | 0.10 |
| 11 | Italian spices | 0.006 |
| 12 | Water (slurry base portion) | 38.34 |
| 13 | Sucrose (dry) | 1.00 |
| 14 | Xanthan gum | 0.10 |

Ingredient no. 4 was obtained from A. E. Staley, Decateur, Illinois, USA.

In this formulation, the homogenized base consisted of ingredients nos. 1–11 The slurry base consisted of ingredients nos. 11–14.

The resulting acidified alfredo-type sauce contained approximately 76% moisture, had a pH of 4.2, a moisture phase acidity level of 0.65%, and a total titratable acid of 0.40% by weight.

EXAMPLE 3

An acidified vanilla pudding composition that may be manufactured and packaged using hotfill, aseptic, or retort processes was produced using the process of Example 1, with the exception that the amount and type of ingredients were those listed below.

| No. | Ingredient | Percent (by weight) |
|---|---|---|
| 1 | Water (homogenized base portion) | 35.15 |
| 2 | Partially hydrogenated soybean oil | 4.0 |
| 3 | Whey protein concentrate (80%) | 1.0 |
| 4 | Certified Coloring No. 5 (yellow) | 0.005 |
| 5 | Sodium stearoyl lactylate | 0.1 |
| 6 | Water (slurry portion) | 35.15 |
| 6 | Corn syrup solids | 6.0 |
| 8 | Modified dent cornstarch (MIRA CLEER ® 340) | 2.75 |
| 9 | Modified waxy cornstarch (REZISTA ®) | 2.2 |
| 10 | Salt | 0.35 |
| 11 | Sucrose (dry) | 10.0 |
| 12 | Vanilla flavor | 0.85 |
| 13 | Butter flavor | 0.25 |
| 14 | Cultured dextrose (5x) | 2.0 |
| 15 | Acid pyrophosphate | 0.1 |
| 16 | Xanthan gum | 0.1 |

Ingredient nos. 8 and 9 were obtained from A. E. Staley, Decateur, Illinois, USA.

The homogenized base consisted of ingredient nos. 1–5, and the slurry base consisted of ingredient nos. 6–16.

The resulting acidified vanilla pudding contained approximately 75% moisture by weight, had a pH of 4.2, a moisture phase acidity level of 0.25%, and a total titratable acid of 0.2% by weight.

EXAMPLE 4

An acidified chocolate pudding that may be manufactured and packaged using hot fill, aseptic or retort processes was produced using the process of Example 1, with the exception that the amount and type of ingredients were those listed below.

| No. | Ingredient | Percent (by weight) |
|---|---|---|
| 1 | Water (homogenized base portion) | 40.5 |
| 2 | Partially hydrogenated soybean oil | 4.0 |
| 3 | Whey protein concentrate (80%) | 0.8 |
| 4 | Water (slurry base portion) | 27.0 |
| 5 | Corn syrup solids | 6.0 |
| 6 | Modified dent cornstarch (MIRA CLEER ® 340) | 2.75 |
| 7 | Modified waxy cornstarch (REZISTA ®) | 2.2 |
| 8 | Salt | 0.35 |
| 9 | Sucrose (dry) | 9.5 |
| 10 | Fructose | 2.0 |
| 11 | Cultured dextrose (5×) | 2.75 |
| 12 | Coca powder (11% fat) | 1.5 |
| 13 | Acid pyrophosphate | 0.1 |
| 14 | Xanthan gum | 0.1 |
| 15 | Sodium stearoyl lactylate | 0.1 |
| 16 | Vanilla flavoring | 0.25 |
| 17 | Sodium benzoate | 0.1 |

Ingredient nos. 5 and 6 were obtained from A. E. Staley, Decateur, Illinois, USA.

The homogenized base consisted of ingredient nos. 1–3, and the slurry base of ingredient nos. 4–17.

The resulting chocolate pudding composition was smooth, creamy, and slightly stiff in texture. It had a pH of 4.2, a moisture content of approximately 75% by weight, a moisture phase acidity level of 0.27%, and a total titratable acid content of 0.2% by weight.

It will be appreciated to those of ordinary skill in the art that changes could be made to the embodiments described above without departing from the broad inventive concept thereof. It is understood, therefore, that this invention is not limited to the particular embodiments disclosed, but is intended to cover modifications within the spirit and scope of the present invention as defined by the appended claims.

We claim:

1. An acidified imitation cheese sauce composition comprising:
   a) a thickener,
   b) an acidulant in an amount greater than 0 but not greater than about 0.5% equivalents of glacial acetic by weight of the composition, and
   c) a protein in an amount greater than 0 but less than 1% by weight of the composition, wherein the composition has a pH of not more than 4.6, moisture in an amount of at least about 55% by weight of the composition, a moisture phase acidity level of greater than 0 but not more than about 1.5%, and organoleptic properties similar to a low acid cheese sauce.

2. The composition according to claim 1, wherein the pH is about 2 to about 4.5.

3. The composition according to claim 1, wherein the pH is about 3.2 to about 4.4.

4. The composition according to claim 1, wherein the moisture is present in an amount of about 60% by weight to about 95% by weight of the composition.

5. The composition according to claim 1, wherein the moisture is present in an amount of about 70% by weight to about 85% by weight of the composition.

6. The composition according to claim 1, wherein the thickener is selected from the group consisting of modified food starch, tapioca, potato starch, cornstarch, rice starch, alginate, carrageenan, xanthan gum, guar gum, locust bean gum, and carboxymethylcellulose (CMC).

7. The composition according to claim 6, wherein the thickener is a modified food starch.

8. The composition according to claim 6, wherein the thickener is selected from the group consisting of a mixture of the modified food starch and xanthan gum, and a mixture of the modified food starch and carboxymethylcellulose (CMC).

9. The composition according to claim 8, wherein the thickener is a mixture of modified food starch and xanthan gum in a ratio of about 2:1 parts by weight to about 20:1 parts by weight.

10. The composition according to claim 1, wherein the thickener is present in an amount of about 0.1% by weight to about 30% by weight of the composition.

11. The composition according to claim 1, wherein the thickener is present in an amount of about 0.5% by weight to about 10% by weight of the composition.

12. The composition according to claim 1, wherein the thickener is present in an amount of about 0.7% by weight to about 7% by weight of the composition.

13. The composition according to claim 1, wherein the thickener is present in an amount of about 4% by weight to about 6% by weight of the composition.

14. The composition according to claim 1, wherein the moisture phase acidity level is about 0.11% to about 1.2%.

15. The composition according to claim 1, wherein the moisture phase acidity level is about 0.3% to about 0.9%.

16. The composition according to claim 1, wherein the moisture phase acidity level is about 0.5% to about 0.7%.

17. The composition according to claim 1, wherein the acidulant is selected from the group consisting of cultured dextrose, glucono-δ-lactone, phosphoric acid, and lactic acid.

18. The composition according to claim 1, wherein the acidulant is present in an amount of about 0.01% by weight to about 40% by weight of the composition.

19. The composition according to claim 1, wherein the acidulant is present in an amount of about 10% by weight to about 35% by weight of the composition.

20. The composition according to claim 1, wherein the acidulant is present in an amount of about 0.01% equivalents of glacial acetic acid by weight to about 0.4% equivalents of glacial acetic acid by weight of the composition.

21. The composition according to claim 1, wherein the acidulant is present in an amount of about 0.1% equivalents of glacial acetic acid by weight to about 0.3% equivalents of glacial acetic acid by weight of the composition.

22. The composition according to claim 1, wherein the protein has an average isoelectric point (pI) of at least about 5.

23. The composition according to claim 1, wherein the protein is one which has a buffering capacity such that an 1% solution by weight of the protein in deionized water requires no more than about 0.3 moles of acetic acid to change the pH of the solution by one pH unit.

24. The composition according to claim 1, wherein the protein is selected from the group consisting of gelatin, whey protein, soy protein, casein, egg protein, and hydrolyzed vegetable protein.

25. The composition according to claim 1, wherein the protein is present in an amount of up to about 0.7% by weight of the composition.

26. The composition according to claim 1, wherein the protein is present in an amount of about 0.2% by weight to about 0.5% by weight of the composition.

27. The composition according to claim 1, further comprising a fat.

28. The composition according to claim 27, wherein the fat is selected from the group consisting of partially hydrogenated vegetable oil, soybean oil, canola oil, sunflower oil, safflower oil, palm kernel oil, coconut oil, and butterfat.

29. The composition according to claim 27, wherein the fat is present as a fat phase dispersed and immobilized within the thickener.

30. The composition according to claim 27, wherein the fat is present in amount of about 10% by weight to about 30% by weight of the composition.

31. The composition according to claim 27, wherein the fat is present in an amount of about 5% by weight to about 15% by weight of the composition.

32. The composition according to claim 1, wherein the composition has a Brookfield viscosity of about 5,000 centipoise to about 50,000 centipoise at 21° C.

33. The composition according to claim 1, wherein the composition has a Brookfield viscosity of about 10,000 centipoise to about 30,000 centipoise at 21° C.

34. The composition according to claim 1, wherein the composition has a Brookfield viscosity of about 15,000 centipoise to about 20,000 centipoise at 21° C.

35. The composition according to claim 1, wherein the composition has a fracturability of about 0.29 N to about 2.9 N at 21° C.

36. The composition according to claim 1, wherein the composition has a fracturability of about 0.49 N to about 2 N at 21° C.

37. The composition according to claim 1, wherein the composition has a fracturability of about 0.59 N at 21° C.

38. The composition according to claim 1, further comprising a cheese flavoring.

39. The composition of claim 38, wherein the cheese flavoring is selected from the group consisting of enzyme modified cheese, enzyme modified lactile products, and synthetic flavors.

40. An acidified imitation cheese sauce composition comprising:
   a) a thickener,
   b) an acidulant in an amount greater than 0 but not greater than about 0.5% equivalents of glacial acetic acid by weight of the composition, and
   c) a protein in an amount greater than 0 but less than 1% by weight of the composition, wherein the composition has a pH of not more than 4.6, moisture in an amount of at least about 55% by weight of the composition, a moisture phase acidity level greater than 0 but not more than about 1.5%, and a fracturability of about 0.29 N to about 2.9 N at 21° C.

41. An acidified imitation cheese sauce composition comprising:
   a) a thickener,
   b) an acidulant in an amount greater than 0 but not greater than about 0.5% equivalents of glacial acetic acid by weight of the composition, and
   c) a protein in an amount greater than 0 but less than about 1% by weight of the composition,
   d) wherein the composition has a pH of not more than 4.6, moisture in an amount of at least about 55% by weight of the composition, a moisture phase acidity level greater than 0 but not more than about 1.5%, and a Brookfield viscosity of about 5,000 centipoise to about 50,000 centipoise at 21° C.

42. An acidified imitation cheese sauce composition comprising:
   a) a thickener,
   b) an acidulant in an amount greater than 0 but not greater than about 0.5% equivalents of glacial acetic acid by weight of the composition,
   c) a protein in an amount greater than 0 but less than about 1% by weight of the composition, and
   d) a cheese flavoring,
   wherein the composition has a pH of not more than 4.6, moisture in an amount of at least about 55% by weight of the composition, and a moisture phase acidity level greater than 0 but not more than about 1.5%.

43. An acidified imitation cheese sauce composition comprising:
   a) a thickener,
   b) an acidulant in an amount greater than 0 but not greater than about 0.5% equivalents of glacial acetic acid by weight of the composition,
   c) a fat, and
   d) a protein in an amount greater than 0 but less than 1% by weight of the composition,
   wherein the composition has a pH of not more than 4.6, moisture in an amount of at least about 55% by weight of the composition, a moisture phase acidity level greater than 0 but not more than about 1.5%, and a fat phase of the composition is dispersed and immobilized within the thickener.

44. An acidified imitation cheese sauce composition comprising:
   a) a thickener,
   b) an acidulant in an amount greater than 0 but not greater than about 0.5% equivalents of glacial acetic acid by weight of the composition,
   c) a protein in an amount greater than 0 but less than 1% by weight of the composition, and
   d) a cheese flavoring,
   e) wherein the composition has a pH of not more than 4.6, moisture in an amount of at least about 55% by weight of the composition, a moisture phase acidity level greater than 0 but not more than about 1.5%, a Brookfield viscosity of about 5,000 centipoise to about 50,000 centipoise at 21° C., and a fracturability of about 0.29 N to about 2.9 N at 21° C.

45. An acidified imitation cheese sauce composition comprising:
   a) a thickner,
   b) an acidulant in an amount greater than 0 but not greater than about 0.5% equivalents of glacial acetic acid by weight, and
   c) a protein in an amount greater than 0 but less than 1% by weight of the composition,
   wherein the composition has a pH of not more than 4.6, moisture in an amount of at least about 55% by weight of the composition, a moisture phase acidity level of greater than 0 but not more than about 1.5%, a Brookfield viscosity of about 5,000 centipoise to about 50,000 centipoise at 21° C., and a fracturability of about 0.29 N to about 2.9 N at 21° C.

46. An acidified pudding composition comprising:
   a) a thickener,
   b) an acidulant in an amount greater than 0 but not greater than about 0.5% equivalents of glacial acetic acid by weight of the composition,
   c) a protein in an amount greater than 0 but less than 1% by weight of the composition, wherein the composition has a pH of not more than 4.6, moisture in an amount of at least about 55% by weight of the composition, a moisture phase acidity level greater than 0 but not more than about 1.5%, and organoleptic properties similar to a low acid pudding.

47. The composition according to claim 46, wherein the pH is about 2 to about 4.5.

48. The composition according to claim 46, wherein the pH is about 3.2 to about 4.4.

49. The composition according to claim 46, wherein the moisture is present in an amount of about 60% by weight to about 95% by weight of the composition.

50. The composition according to claim 46, wherein the moisture is present in an amount of about 70% by weight to about 85% by weight of the composition.

51. The composition according to claim 46, wherein the thickener is selected from the group consisting of modified food starch, tapioca, potato starch, cornstarch, rice starch, alginate, carrageenan, xanthan gum, guar gum, locust bean gum, and carboxymethylcellulose (CMC).

52. The composition according to claim 51, wherein the thickener is a modified food starch.

53. The composition according to claim 51, wherein the thickener is selected from the group consisting of a mixture of the modified food starch and xanthan gum, and a mixture of the modified food starch and carboxymethylcellulose (CMC).

54. The composition according to claim 53, wherein the thickener is a mixture of the modified food starch and xanthan gum in a ratio of about 100:0.01 parts by weight to about 95:5 parts by weight.

55. The composition according to claim 53, wherein the thickener is a mixture of the modified food starch and carboxymethylcellulose (CMC) in a ratio of about 80:20 parts by weight to about 95:5 parts by weight.

56. The composition according to claim 46, wherein the thickener is present in an amount of about 0.1% by weight to about 30% by weight of the composition.

57. The composition according to claim 46, wherein the thickener is present in an amount of about 0.5% by weight to about 10% by weight of the composition.

58. The composition according to claim 46, wherein the thickener is present in an amount of about 0.7% by weight to about 7% by weight of the composition.

59. The composition according to claim 46, wherein the thickener is present in an amount of about 4% by weight to about 6% by weight of the composition.

60. The composition according to claim 46, wherein the moisture phase acidity level is about 0.11% to about 1.2%.

61. The composition according to claim 46, wherein the moisture phase acidity level is about 0.3% to about 0.9%.

62. The composition according to claim 46, wherein the moisture phase acidity level is about 0.5% to about 0.7%.

63. The composition according to claim 46, wherein the acidulant is selected from the group consisting of cultured dextrose, glucono-δ-lactone, phosphoric acid, and lactic acid.

64. The composition according to claim 46, wherein the acidulant is present in an amount of about 0.01% by weight to about 40% by weight of the composition.

65. The composition according to claim 46, wherein the acidulant is present in an amount of about 10% by weight to about 35% by weight of the composition.

66. The composition according to claim 46, wherein the acidulant is present in an amount of about 0.01% equivalents of glacial acetic acid by weight to about 0.4% equivalents of glacial acetic acid by weight of the composition.

67. The composition according to claim 46, wherein the acidulant is present in an amount of about 0.1% equivalents of glacial acetic acid by weight to about 0.3% equivalents of glacial acetic acid by weight of the composition.

68. The composition according to claim 46, wherein the protein has an average isoelectric point (pI) of about at least 5.

69. The composition according to claim 46, wherein the protein is one which has a buffering capacity such that a 1% solution of the protein in deionized water requires at least no more than about 0.3 moles of acetic acid to change the pH of the solution by one pH unit.

70. The composition according to claim 46, wherein the protein is selected from the group consisting of gelatin, whey protein, soy protein, casein, egg protein, and hydrolyzed vegetable protein.

71. The composition according to claim 46, wherein the protein is present in an amount of up to about 0.7% by weight of the composition.

72. The composition according to claim 46, wherein the protein is present in an amount of about 0.2% by weight to about 0.5% by weight of the composition.

73. The composition according to claim 46, further comprising a fat.

74. The composition according to claim 73, wherein the fat is present in a fat phase dispersed and immobilized within the thickener.

75. The composition according to claim 73, wherein the fat is selected from the group consisting of partially hydrogenated vegetable oil, soybean oil, canola oil, sunflower oil, safflower oil, palm kernel oil, coconut oil, and butterfat.

76. The composition of claim 73, wherein the fat is present in an amount up to about 5% by weight of the composition.

77. The composition of claim 73, wherein the fat is present in an amount of about 2% by weight to about 4% by weight of the composition.

78. The composition according to claim 46, wherein the composition has a Brookfield viscosity of about 5,000 centipoise to about 50,000 centipoise at 21° C.

79. The composition of claim 46 having a Brookfield viscosity of about 10,000 centipoise to about 30,000 centipoise at 21° C.

80. The composition of claim 46, wherein the composition has a Brookfield viscosity of about 15,000 centipoise to about 20,000 centipoise at 21° C.

81. The composition of claim 46, wherein the composition has a fracturability of about 0.29 N to about 2.9 N at 21° C.

82. The composition of claim 46, wherein the composition has a fracturability of about 0.49 N to about 2 N at 21° C.

83. The composition of claim 46, wherein the composition has a fracturability of 0.59 N at 21° C.

84. The composition according to claim 46, further comprising a flavoring that imparts a non-savory, dessert flavor to the composition.

85. The composition of claim 84, wherein the flavoring is selected from the group consisting of chocolate, vanilla, fudge, butterscotch, and banana.

86. The composition according to claim 46, further comprising a sweetener.

87. The composition according to claim 86, wherein the sweetener is selected from the group consisting of sucrose, fructose, corn syrup, aspartame, and sucralose.

88. An acidified pudding composition comprising:
a) a thickener,
b) an acidulant in an amount greater than 0 but not greater than about 0.5% equivalents of glacial acetic acid by weight of the composition, and
c) a protein in an amount greater than 0 but less than 1% by weight of the composition,
d) a pudding flavor, wherein the composition has a pH of not more than 4.6, moisture in an amount of at least about 55% by weight of the composition, a moisture phase acidity level greater than 0 but not more than about 1.5%, and a fracturability of about 0.29 N to about 2.9 N at 21° C.

89. An acidified pudding composition comprising:
a) a thickener,
b) an acidulant in an amount greater than 0 but not greater than about 0.5% equivalents of glacial acetic acid by weight of the composition, and
c) a protein in an amount greater than 0 but less than 1% by weight of the composition,
d) a pudding flavor, wherein the composition has a pH of not more than 4.6, moisture in an amount of at least about 55% by weight of the composition, a moisture phase acidity level greater than 0 but not more than about 1.5%, and a Brookfield viscosity of about 5,000 centipoise to about 50,000 centipoise at 21° C.

90. An acidified pudding composition comprising:
a) a thickener,
b) an acidulant in an amount greater than 0 but not greater than about 0.5% equivalents of glacial acetic acid by weight of the composition,
c) a protein in an amount greater than 0 but less than 1% by weight of the composition, and
d) a flavoring that imparts a non-savory, dessert flavor to the composition, wherein the composition has a pH of about 4.6 or less, moisture in an amount of at least about 55% by weight of the composition, and a moisture phase acidity level greater than 0 but not more than about 1.5%.

91. An acidified pudding composition comprising:
a) a thickener,
b) an acidulant in an amount greater than 0 but not greater than about 0.5% equivalents of glacial acetic acid by weight of the composition,
c) a fat, and
d) a protein in an amount greater than 0 but less than 1% by weight of the composition, wherein the composition has a pH of not more than 4.6, moisture in an amount of at least about 55% by weight of the composition, a moisture phase acidity level greater than 0 but not more than about 1.5% or less, and a fat phase of the composition is dispersed and immobilized within the thickener.

92. An acidified pudding composition comprising:
a) a thickener,
b) an acidulant in an amount greater than 0 but not greater than about 0.5% equivalents of glacial acetic acid by weight of the composition,
c) a protein in an amount greater than 0 but less than 1% by weight of the composition, and
d) a flavoring that imparts a non-savory, dessert flavor to the composition, wherein the composition has a pH of not more than 4.6, moisture in an amount of at least about 55% by weight of the composition, a moisture phase acidity level greater than 0 but not more than about 1.5%, a Brookfield viscosity of about 5,000 centipoise to about 50,000 centipoise at 21° C., and a fracturability of about 0.29 N to about 2.9 N at 21° C.

93. An acidified imitation pudding composition comprising:
a) a thickener and a pudding flavoring,
b) an acidulant in an amount greater than 0 but not greater than about 0.5% equivalents of glacial acetic acid by weight of the total composition,
c) a protein in an amount greater than 0 but less than 1% by weight of the composition, and
d) a Brookfield viscosity of about 5,000 centipoise to about 50,000 centipoise at 21° C., wherein the composition has a pH of not more than 4.6, moisture in an amount of at least about 55% by weight of the composition, a moisture phase acidity level of greater than 0 but not more than about 1.5%, and a fracturability of about 0.29 N to about 2.9 N at 21° C.

94. An acidified imitation pudding composition comprising:
a) a thickener,
b) an acidulant in an amount greater than 0 but not greater than about 0.5% equivalents of glacial acetic acid by weight of the composition,
c) a protein in an amount greater than 0 but less than 1% by weight of the composition, and
d) a sweetener, wherein the composition has a pH of not more than 4.6, moisture in an amount of at least about 55% by weight of the composition, a moisture phase acidity level greater than 0 but not more than about 1.5%, a Brookfield viscosity of about 5,000 centipoise to about 50,000 centipoise at 21° C., and a fracturability of about 0.29 N to about 2.9 N at 21° C.

95. A method of preserving an imitation cheese sauce, the method comprising the steps of
a) preparing a composition comprising moisture in an amount of at least about 55% by weight of the composition, a thickener, a protein in an amount greater than 0 but less than 1% by weight of the composition, and a cheese flavoring, and
b) acidifying the composition to a pH of not more than 4.6 by addition of an acidulant in an amount greater than 0 but not greater than about 0.5% equivalents of glacial acetic acid by weight of the composition, such that the imitation cheese sauce has an increased microbial stability, wherein the resulting composition is one which has organoleptic properties similar to a low acid cheese sauce.

96. A method for increasing the microbial stability and shelf-life of an imitation cheese sauce, the method comprising the steps of
a) preparing a composition comprising moisture in an amount of at least about 55% by weight of the composition, a thickener, a protein in an amount of greater than 0 but less than 1% by weight of the composition, and a cheese flavoring, and
b) acidifying the composition to a pH of not more than 4.6 by addition of an acidulant in an amount greater than 0 but not greater than about 0.5% equivalents of glacial acetic acid by weight, such that the imitation cheese sauce has an increased microbial stability, wherein the resulting composition is one which has a fracturability of about 0.29 N to about 2.9 N at 21° C.

97. A method of preserving a pudding, the method comprising the steps of:

a) preparing a composition comprising moisture in an amount of at least about 55% by weight of the composition, a thickener, a protein in an amount greater than 0 but less than 1% by weight of the composition, and a flavoring that imparts a non-savory, dessert flavor to the composition, and b) acidifying the composition to a pH of not more than 4.6 or less by addition of an acidulant in an amount greater than 0 but not greater than about 0.5% equivalents of glacial acetic acid by weight, such that the pudding has an increased microbial stability, wherein the resulting composition is one which has organoleptic properties similar to a low acid pudding.

98. A method for increasing the microbial stability of a pudding, the method comprising the steps of a) preparing a composition comprising moisture in an amount of at least about 55% by weight of the composition, a thickener, a protein in an amount of greater than 0 but less than 1% by weight of the composition and a flavoring that imparts a non-savory, desert flavor to the composition, and b) acidifying the composition to a pH of not more than 4.6 by addition of an acidulant in an amount greater than 0 but about not greater than 0.5% equivalents of glacial acetic acid by weight, such that the pudding has an increased microbial stability, wherein the resulting composition has a fracturability of about 0.29 N to about 2.9 N at 21° C.

* * * * *